United States Patent
Heise et al.

(10) Patent No.: US 7,602,581 B2
(45) Date of Patent: Oct. 13, 2009

(54) INTERPOLATED JUST-IN-TIME SEEK TRAJECTORIES

(75) Inventors: Nyles Heise, San Jose, CA (US); Hung M. Vu, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/870,030

(22) Filed: Oct. 10, 2007

(65) Prior Publication Data

US 2009/0097150 A1    Apr. 16, 2009

(51) Int. Cl.
*G11B 5/596* (2006.01)
(52) U.S. Cl. ................... 360/78.07; 360/78.04
(58) Field of Classification Search ............ None
See application file for complete search history.

(56) References Cited

U.S. PATENT DOCUMENTS

| | | | | |
|---|---|---|---|---|
| 5,570,332 A | * | 10/1996 | Heath et al. | 369/30.1 |
| 6,178,060 B1 | * | 1/2001 | Liu | 360/78.07 |
| 6,310,743 B1 | * | 10/2001 | Haines et al. | 360/78.07 |
| 6,507,451 B1 | * | 1/2003 | Sugimoto | 360/78.07 |
| 6,515,819 B1 | * | 2/2003 | Schmidt et al. | 360/78.04 |
| 6,725,327 B1 | * | 4/2004 | Espeseth et al. | 711/112 |
| 7,023,652 B1 | * | 4/2006 | DeRosa | 360/78.04 |
| 2003/0174433 A1 | * | 9/2003 | Espeseth et al. | 360/78.07 |

\* cited by examiner

*Primary Examiner*—Andrew L Sniezek
(74) *Attorney, Agent, or Firm*—Patterson & Sheridan, L.L.P.

(57) ABSTRACT

Methods and apparatus of the present invention allow for interpolated Just in Time (iJIT) seek command control of hard drive actuators.

20 Claims, 7 Drawing Sheets

INTERPOLATED JUST-IN-TIME SEEK TRAJECTORIES

BACKGROUND OF THE INVENTION

1. Field of the Invention

Embodiments of the present invention generally relate to hard drives and, more particularly, to a method for saving power during seeks of hard drives.

2. Description of the Related Art

In past hard drive systems, actuators would be run at full power for every seek required. Even if a longer seek time was associated with a given command, the actuator of the hard drive would run at full power to try and position itself for reading the information as quickly as possible. However, if given a longer rotation time, the actuator has a longer time to position itself in the correct area and could be moved at less than full power.

A method called Just-in-Time (or JIT) was developed to capture this power saving idea. In the first applications of JIT only one level was implemented which decreased acceleration time and thus the velocity of the actuator in the hard drive for longer seek times and thus saved power. In later versions, 4 levels of JIT were implemented allowing for further power saving possibilities. If a seek time was deemed to be within a given JIT level's seek time range the actuator would be limited to a predetermined velocity, associated with that JIT level, thus slowing the actuator to save power. In order to realize even further power savings, the number of JIT levels needs to be increased. However, adding more predetermined JIT levels increases table size and the time required to create, and adjust, table entries.

This presents the need for a method that can add further levels of power saving capability without increasing used space and while maintaining a high level of efficiency.

SUMMARY OF THE INVENTION

One embodiment provides a method for saving power in a hard drive by regulating the velocity of an actuator. The method generally includes determining a first expected seek time for a first command, determining velocity values corresponding to seek times surrounding the first expected seek time, interpolating between the determined velocity values to calculate an interpolated velocity value, and executing the first command utilizing the interpolated velocity value to control the actuator.

One embodiment provides a method for saving power in a hard drive by regulating the velocity of an actuator. The method generally includes (a) setting a number of predetermined maximum velocity values corresponding to seek time values; (b) determining expected seek times for a number of commands; (c) storing the commands in order of their respective expected seek times in a queue; (d) determining which of the seek time values surround a respective expected seek time of a first command in the queue; (e) interpolating between predetermined maximum velocity values corresponding to the seek time values surrounding the expected seek time of the first command, to determine an interpolated velocity value; and (f) executing the first command utilizing the interpolated velocity value.

One embodiment provides a controller for saving power in a hard drive by regulating the velocity provided to an actuator. The controller generally includes a queue for storing seek commands and logic for determining velocity values corresponding to expected seek times of commands, interpolating between determined velocity values to calculate interpolated velocity levels, and executing commands utilizing the interpolated velocity levels to control the actuator during execution.

One embodiment provides a hard drive generally including an actuator, a table for storing a discrete number of seek times and corresponding velocity values, and a controller configured to determine velocity values corresponding to expected seek times of commands, retrieve velocity values from the table corresponding to seek times surrounding the expected seek times, interpolate between retrieved velocity values to calculate interpolated velocity levels, and execute commands utilizing the interpolated velocity levels to control the actuator during execution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Figure 1:
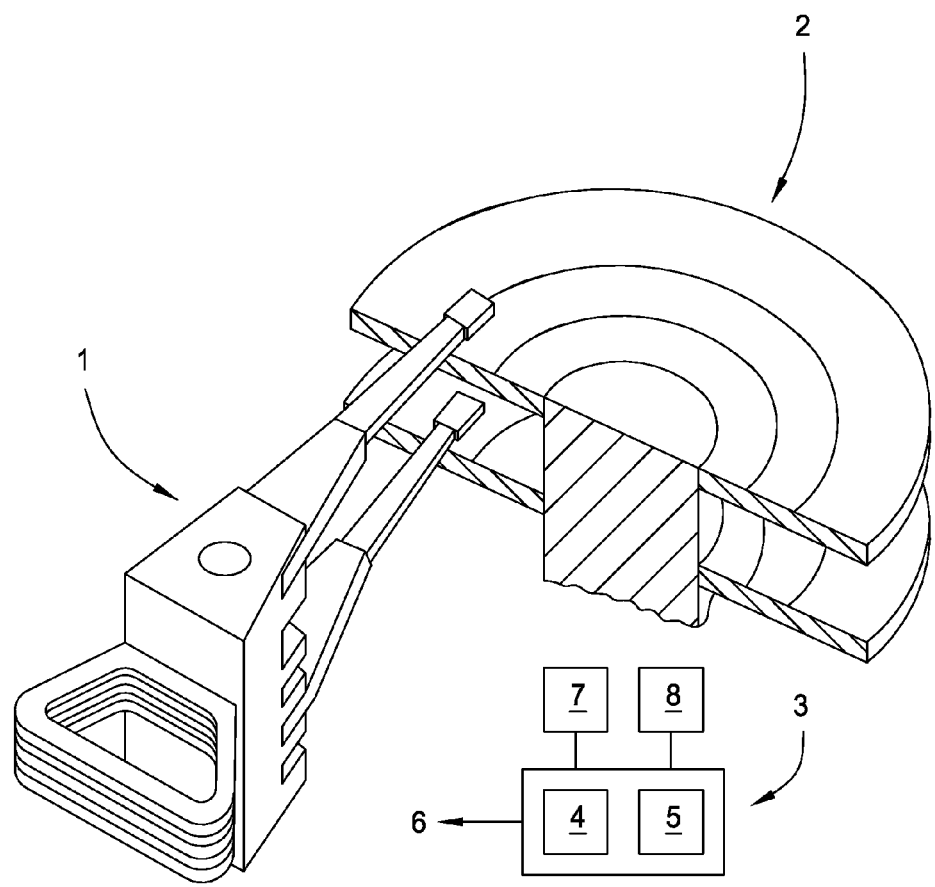
FIG. 1 illustrates an example hard drive actuator and disk.

A typical hard drive actuator 1 and disk 2 setup is shown in FIG. 1 to help illustrate the topic of the present invention. The actuator 1 requires power to pivot and position the ends to read from a specified area of the disk 2 for a given command. The voltage distributed to the actuator 1 can be regulated to control the movement of the actuator 1. For example, when sufficient seek time is available a lower velocity is used, but when a less seek time is available a higher voltage is required to position the actuator to the correct area in time. This regulation of velocity helps to save power. A controller 3 is shown for saving power in a hard drive by regulating the velocity provided to the actuator 1. The controller 3 includes a queue 4 for storing seek commands, and logic 5. Logic 5 determines velocity values corresponding to expected seek times of commands, interpolates between determined velocity values to calculate interpolated velocity levels, and executes commands utilizing the interpolated velocity levels to control the actuator 1 during execution. A control register 7, receives a write command to enable the interpolation, and a table 8 stores a discrete number of seek times and corresponding velocity values. The voltage 6 regulated by the controller 3 is distributed to the actuator 1.

Embodiments of an interpolated Just-in-Time (or iJIT) method of the present invention allow for an infinite number of different JIT levels, which may help to optimize power saving possibilities. iJIT may require only an increase in code over present JIT code in order to operate. This method also does not increase the table space used with the increased number of JIT levels possible.

Figure 2:
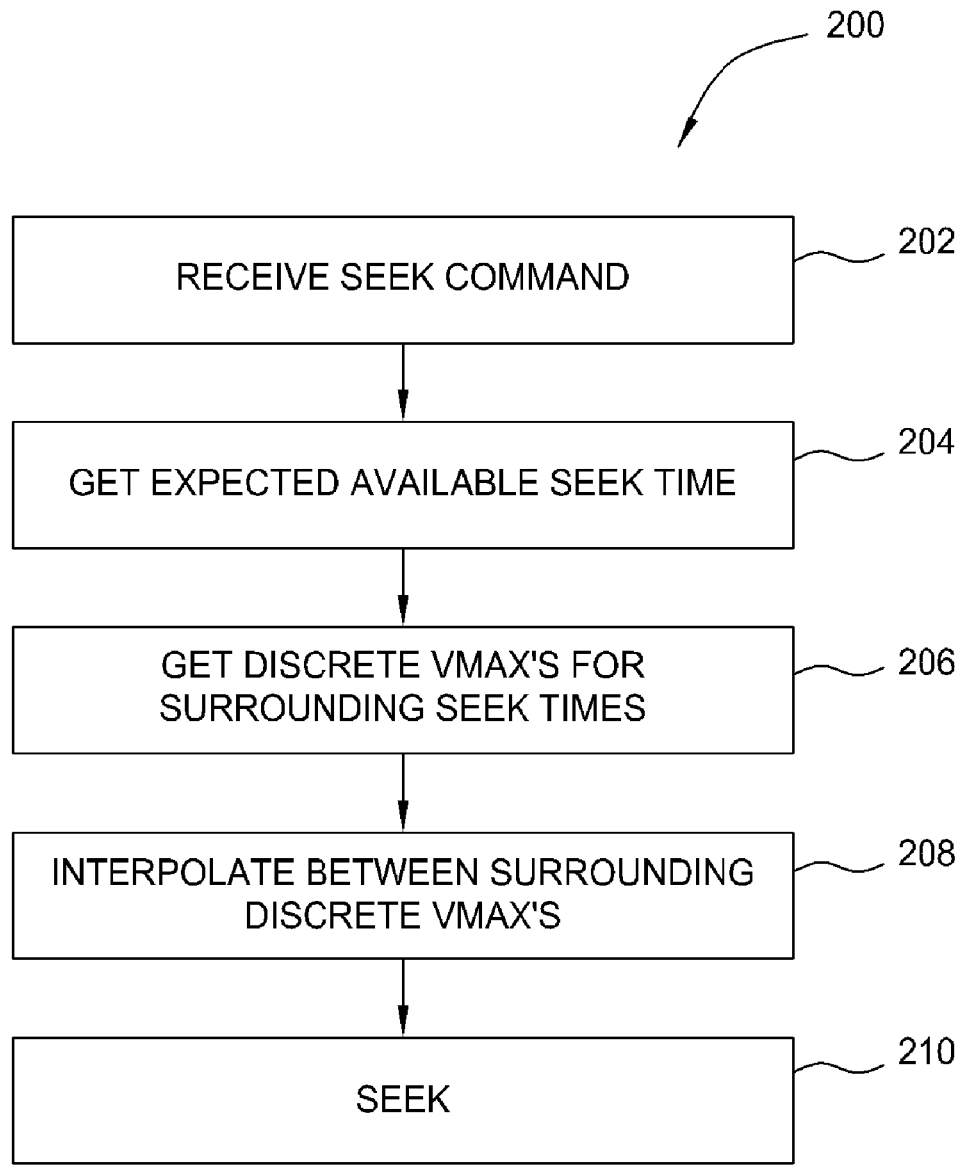
FIG. 2 is a flow chart of operations for performing interpolated just-in-time (iJIT), in accordance with an embodiment of the method of the invention.

FIG. 2 depicts a flow chart for example operations of an iJIT method. A number of seek commands can be received and queued, at step 202, which specify information to be read from the hard drive disk 2. At step 204, an expected available time to seek the information on the disk 2 for each command is determined, for example, using a time-based relocation expected access time (or TREAT) algorithm. Such an algorithm is explained in detail in U.S. Pat. No. 6,859,859, entitled "Method and System for Efficiently Calculating and Storing Expected Access Time Information for DASD".

After the expected command times for the commands are determined, they may be ordered from shortest expected command time to longest expected command time in a TREAT time chart. The command with the shortest expected command time is carried out first. If the seek time for a command is too long and cannot be read in time, a penalty may be given to the command and the command is moved to the appropriate position within the TREAT time chart. Such "adjusted" command times may be used for interpolation as described herein.

A number of predetermined maximum velocity values (or Vmax) are set at different seek time values. Based on the available seek time for a given command it will be between two of the predetermined seek time values. At step 206, the Vmax values corresponding to the surrounding seek time values are retrieved. At step 208, the discrete Vmax's are used to interpolate the velocity needed for the actuator 1. For some embodiments, these calculations may be integrated into the TREAT and command queue operations. Once the needed velocity has been calculated, the seek is executed at step 210, and the voltage is supplied to the actuator 1 and the process is repeated for the next command in queue.

Figure 3:
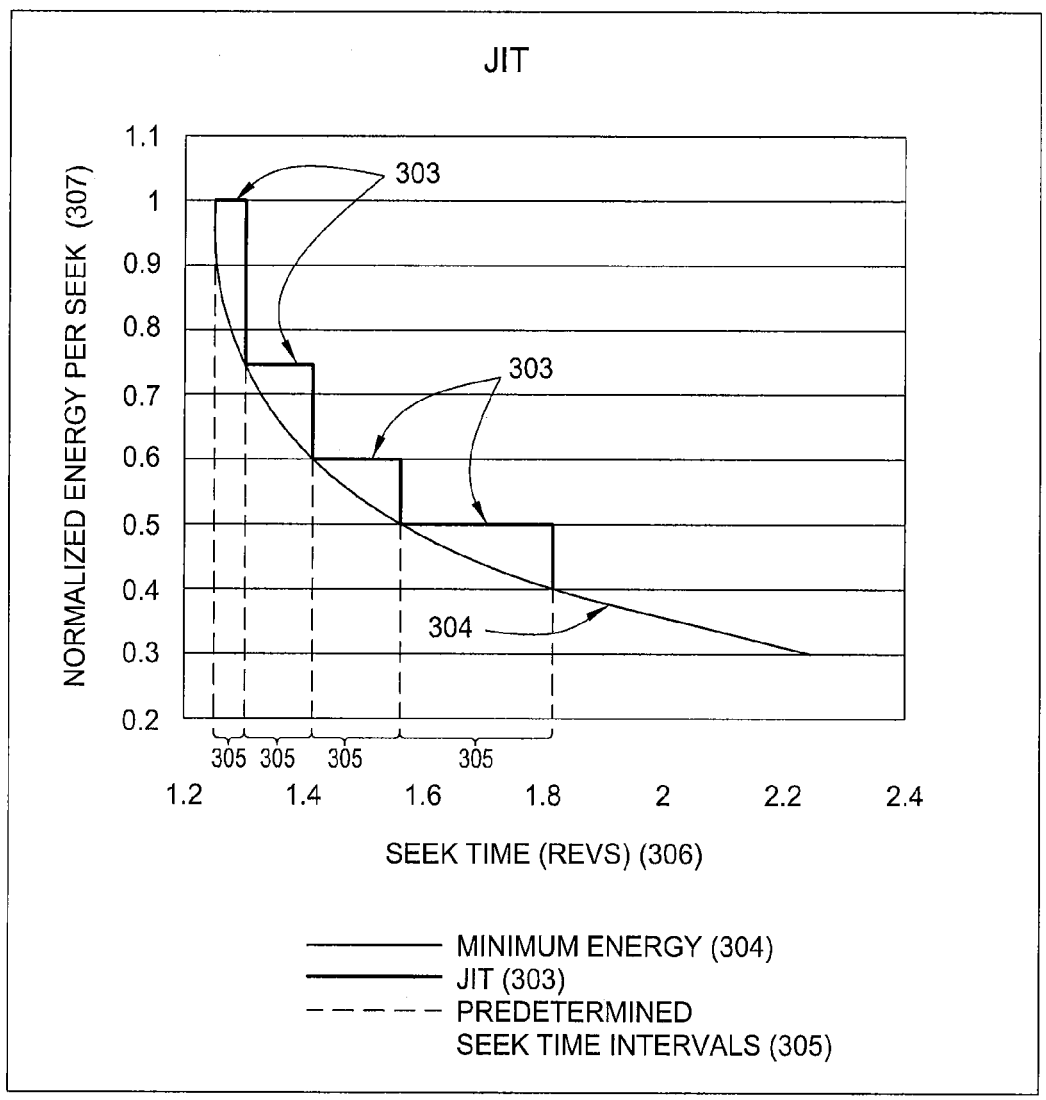
FIG. 3 is a graph of the energy per seek versus seek time of previous energy saving techniques with set energy saving levels.

FIG. 3 shows a graph displaying previous power saving techniques where four JIT levels 303 have been set in predetermined seek time intervals 305. A minimum energy curve 304 is shown to help illustrate the idealistic normalized energy per seek 307 used by the actuator 1 for a range of seek times 306. The JIT method provides the same Vmax for all commands within a particular JIT level's seek time interval 305.

Figure 4:
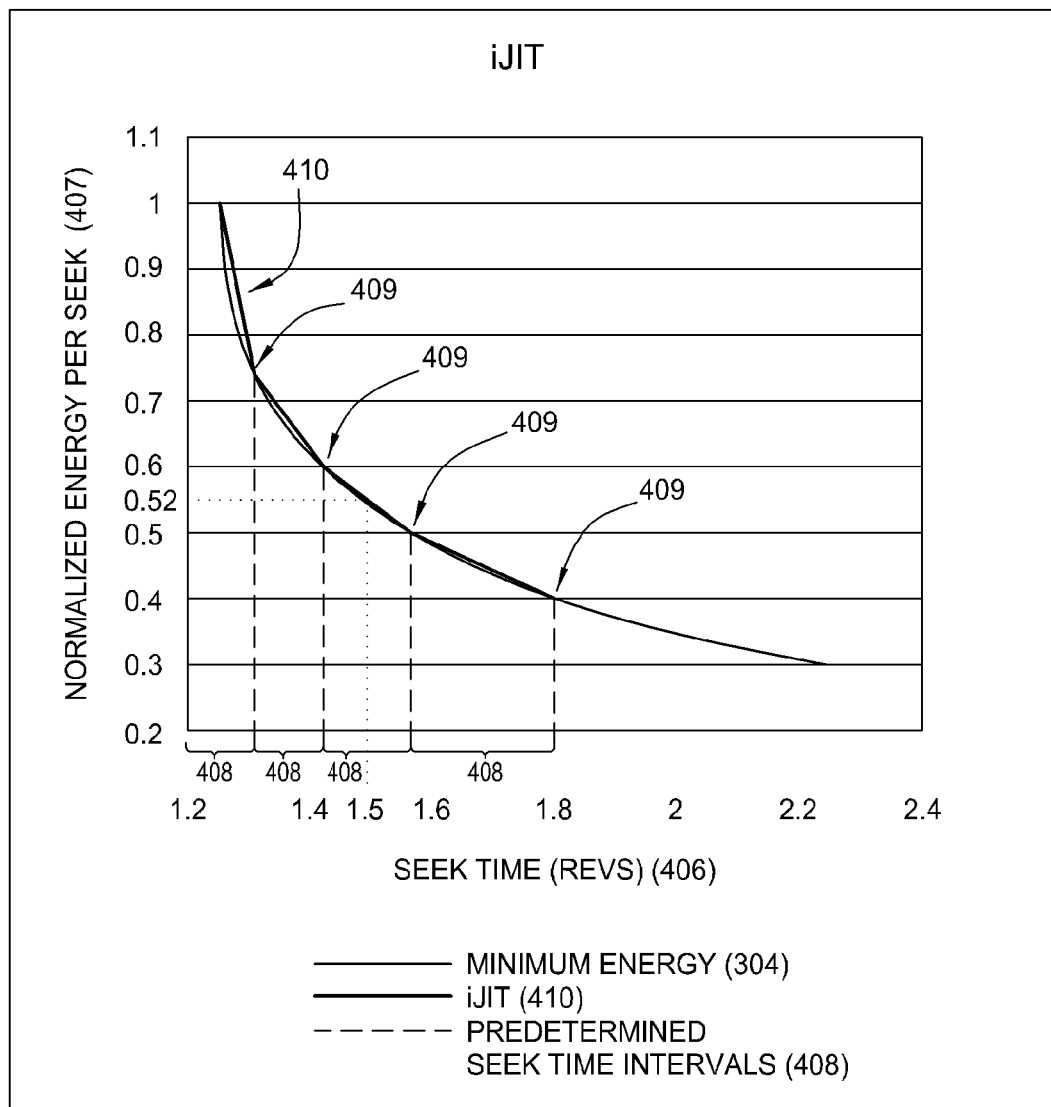
FIG. 4 is a graph of the energy per seek versus seek time with energy saving possibilities of one embodiment of the current invention.

To improve on the previous methods shown in FIG. 3, FIG. 4 shows the same graph with an embodiment of the iJIT method 410. Comparing the graphs of FIGS. 3 and 4 show the difference in power savings. iJIT fits much closer to the minimum energy curve 304 and creates the greatest amount of power savings. In the shown embodiment four Vmax values 409 have been set at predetermined seek time values 408. This allows for the interpolation of the energy needed for each command based on its required seek time. If the seek time for a command is between two predetermined seek time values 408 the velocity for that command is determined by interpolating between the surrounding Vmax values 409. This method allows for an infinite number of possible velocity values and allows for unique values for each command without spending much time or processing power.

The power saving possibilities can be seen in the example described below. For previous methods, looking at FIG. 3, the actuator would be supplied 0.6 units of energy for a command with an expected seek time of 1.5 due to the predetermined Vmax for that JIT level. In the embodiment of iJIT shown in FIG. 4, the actuator would be supplied with 0.52 units of energy for a command with the same expected seek time of 1.5 due to the interpolation of the surrounding discrete Vmax's. For both methods the actuator will reach its destination in time, but iJIT will do it with less energy. An equation used for interpolation would be, for example:

$$used\_velocity = vmax1 + (rotation - rotation1)/(rotation2 - rotation1) * (vmax2 - vmax1)$$

Figure 5:
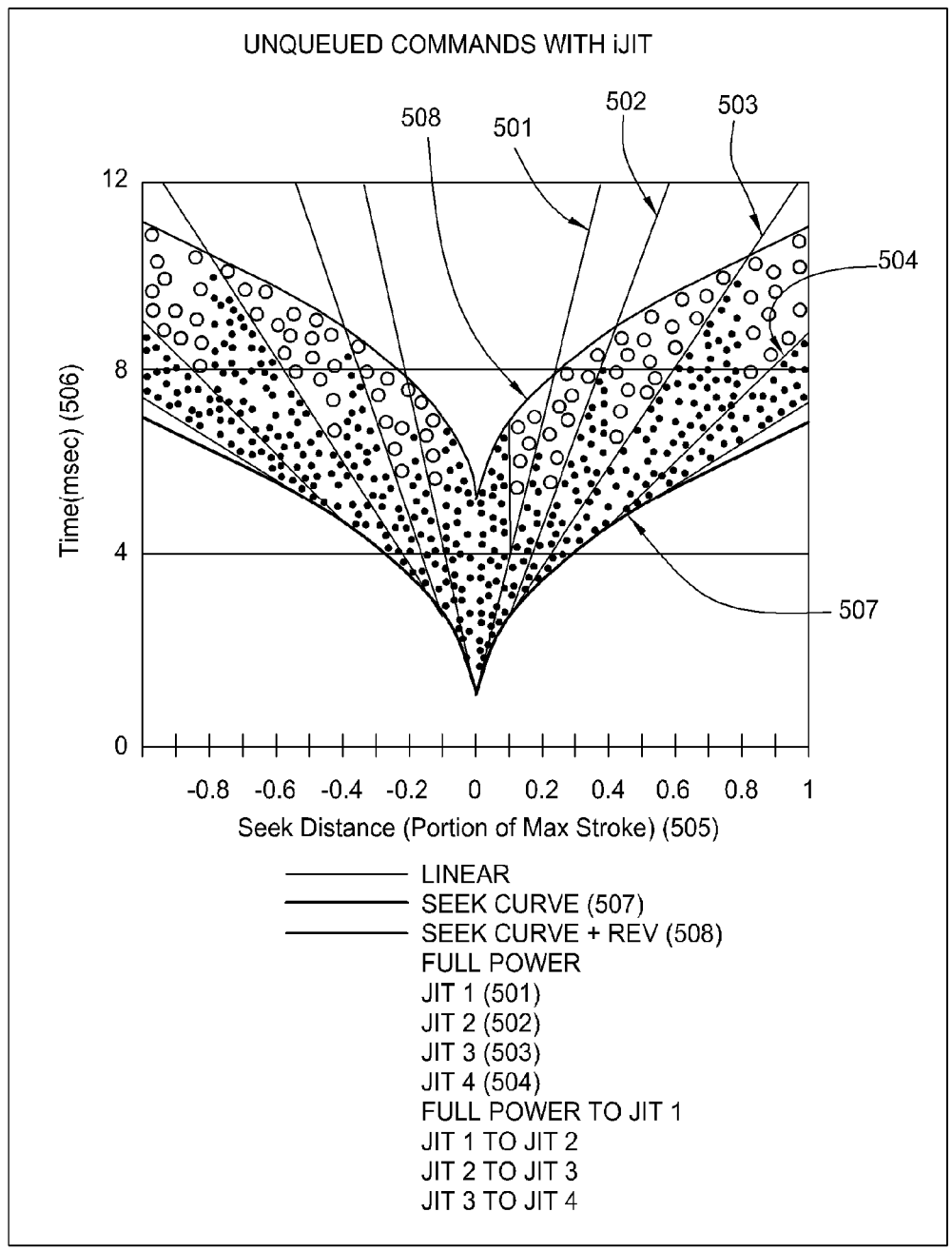
FIG. 5 is a plot of seek distance versus time showing commands which may be interpolated for one embodiment.

FIG. 5 illustrates details of an embodiment of iJIT on a graph of seek distance 505 versus time 506 where the band between the seek curve 507 and the seek curve plus one Rev 508 defines the area in which commands occur. iJIT uses an interpolated Vmax when the command lies between two linear Jit curves 501-504. An interpolated value is also used if the command lies between the seek curve 507 and the Jit1 curve 504. Interpolation is not done when the point lies between a Jit curve 501-504 and the seek curve plus one Rev 508. In the chart, commands that use an interpolated value are in the darkened colors. By interpolating the energy is minimized and the command completes without missing a Rev. All commands that are not darkened use a Vmax value of a later JIT level so that they can be read without being missed.

Another improvement made by certain embodiments of the present invention is the efficiency of the TREAT methods ability to "learn". Based on the TREAT time charts the TREAT method can adapt to each hard drives use by interpreting the number of times an area is accessed in comparison to other areas. This allows a more rapid computation of seek times for various commands based on where the command says to access.

With the application of more predetermined JIT levels, however, the TREAT method has a harder time "learning" these attributes and this does not occur with certain embodiments of the iJIT method. Thus, interpolation allows for a reduced number of JIT levels, while still providing an effective infinite number of interpolated values. In addition, iJIT allows normal TREAT operations to be used to select the values used for interpolation. Further, for some embodiments, a user may have the flexibility to enable/disable the iJIT feature, if desired, for example, by changing a bit in a control register on the hard drive.

Figure 6A:
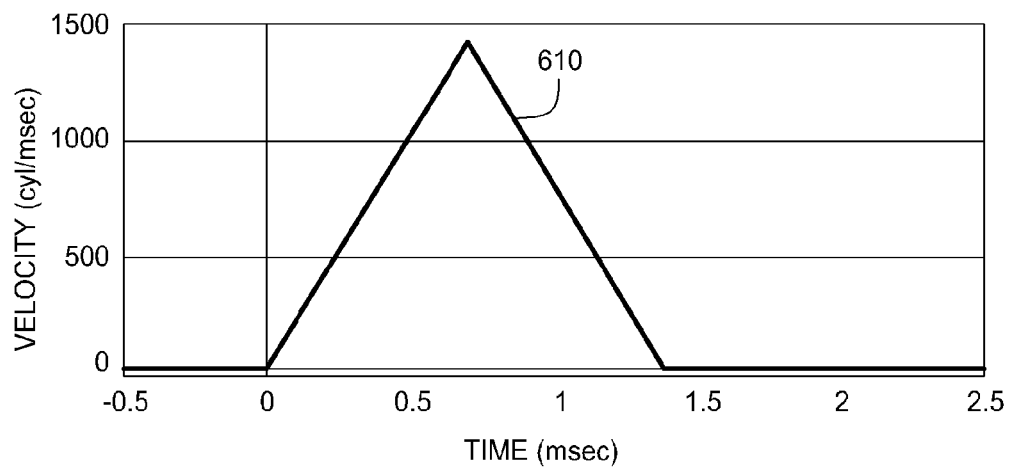
FIGS. 6A and 6B are plots associating the velocity and acceleration of an actuator with time assuming a shorter seek time.
Figure 6B:
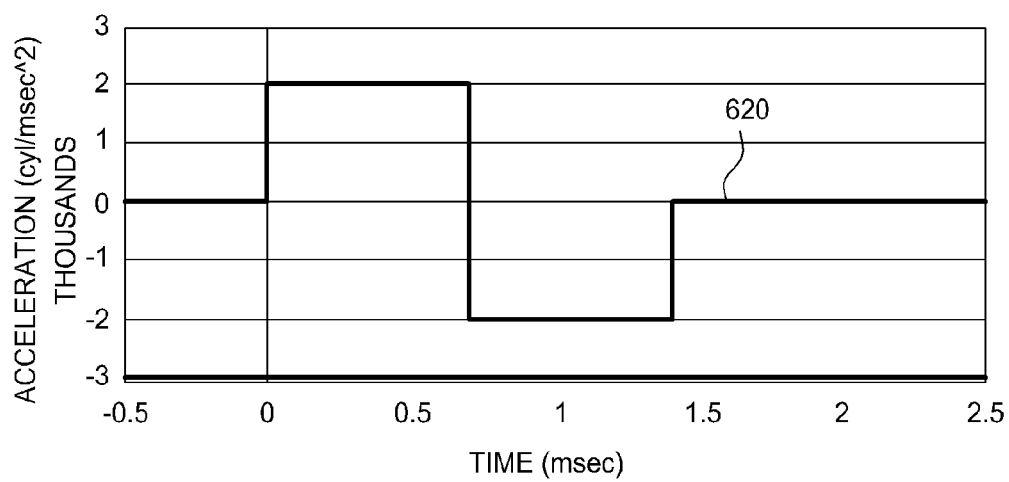

FIGS. 6A and 6B illustrate an example of a velocity and an acceleration graph for a possible hard drive actuator, where the actuator is driven at full power to try and position itself for reading the information as quickly as possible. Element 610 of FIG. 6A shows the velocity increase to approximately 1400 cycles per millisecond in roughly 0.7 milliseconds when addressing a shorter total seek time of approximately 1.4 milliseconds. This is followed by the velocity decreasing to 0 in the same amount of time. Accordingly, FIG. 6B shows a possible corresponding acceleration 620 of approximately 2000 cycles per millisecond squared for the first 0.7 milliseconds immediately followed by a negative acceleration approximately equal to 2000 cycles per millisecond squared for the following 0.7 milliseconds. In this example, the total seek time is 1.4 milliseconds and a representation of the energy used could be found in the displacement of the velocity curve, which is approximately equal to 980 cycles. When the number of cycles is divided by the time taken it yields an arbitrary power value of 700 cycles per millisecond, where an arbitrary power value is equal to the power necessary to drive an actuator the determined number of times per millisecond.

Figure 7A:
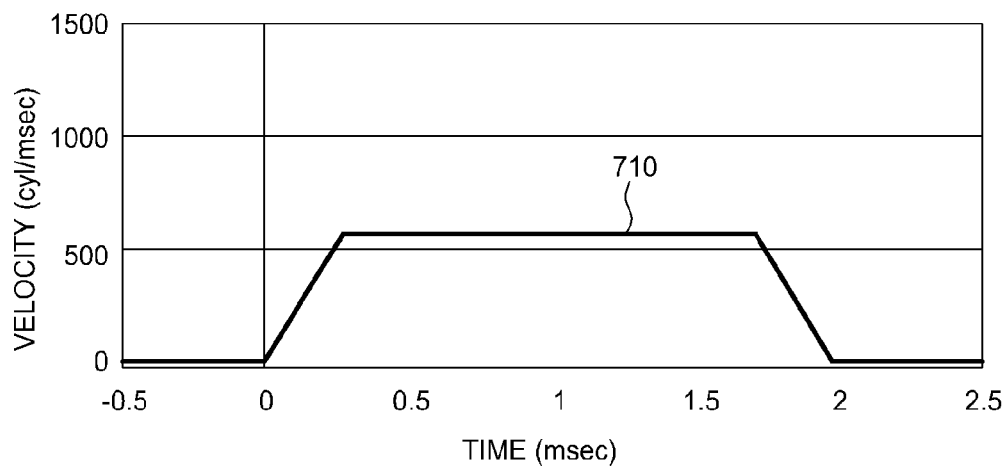
FIGS. 7A and 7B are plots associating the velocity and acceleration of an actuator with time assuming a longer seek time.
Figure 7B:
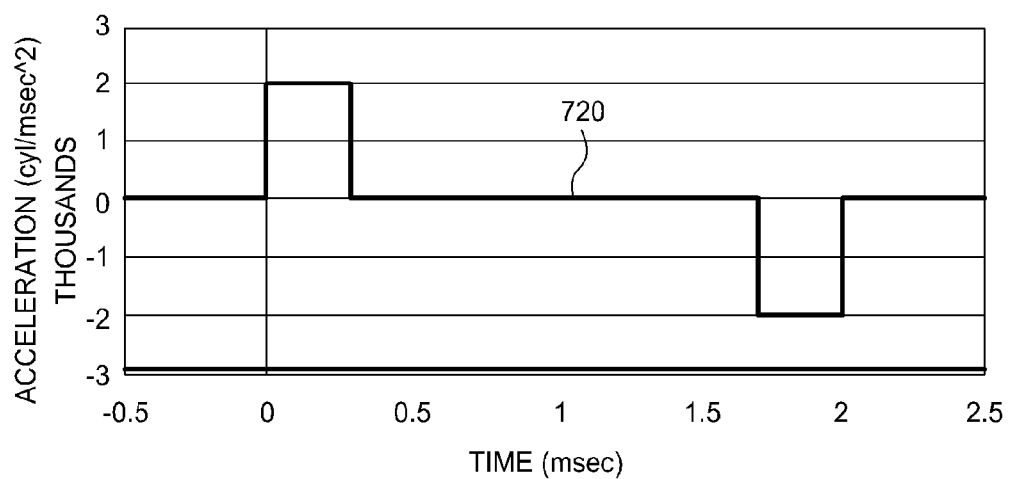

FIGS. 7A and 7B illustrate an example of a velocity and an acceleration graph for a possible hard drive actuator, where the actuator is not driven to position itself as quickly as possible, but instead is driven to take a larger portion of the allotted seek time. Element 710 of FIG. 7A shows the velocity increase to approximately 600 cycles per millisecond in roughly 0.3 milliseconds, followed by a time of approximately 1.4 milliseconds of a constant velocity, followed again by the velocity decreasing to 0 in approximately 0.3 milliseconds when addressing a longer total seek time of approximately 2 milliseconds. Accordingly, FIG. 6B shows a possible corresponding acceleration 720 of approximately 2000 cycles per millisecond squared for the first 0.3 milliseconds, followed by no acceleration for roughly 1.4 milliseconds, followed by a negative acceleration approximately equal to 2000 cycles per millisecond squared for the following 0.3 milliseconds. In this example, the total seek time is 2.0 milliseconds and a representation of the energy used could be found in the displacement of the velocity curve approximately equal to 1020 cycles. When the number of cycles is divided by the time taken would yield an arbitrary power value of 510 cycles per millisecond, yielding a power savings equal to the power necessary to drive the actuator 190 cycles per millisecond faster.

While the foregoing is directed to embodiments of the present invention, other and further embodiments of the invention may be devised without departing from the basic scope thereof, and the scope thereof is determined by the claims that follow.

The invention claimed is:

1. A method for saving power in a hard drive by regulating the velocity of an actuator, comprising:
   determining a first expected seek time for a first command;
   determining velocity values corresponding to seek times surrounding the first expected seek time;
   interpolating between the determined velocity values to calculate an interpolated velocity value; and
   executing the first command utilizing the interpolated velocity value to control the actuator.

2. The method of claim 1, wherein interpolating between the determined velocity values comprises linear interpolation.

3. The method of claim 1, wherein determining the first expected seek time comprises utilizing a time-based relocation expected access time (TREAT) algorithm.

4. The method of claim 1, comprising receiving a command to enable the interpolation.

5. The method of claim 4, wherein the received command comprises a command to write to a control register to enable the interpolation.

6. The method of claim 1, further comprising:
   determining a second expected seek time for a second command; and
   in response to determining a velocity value corresponding to the second expected seek time is not between the determined velocity values, executing the second command utilizing the velocity value corresponding to the second expected seek time without interpolation.

7. A method for saving power in a hard drive by regulating the velocity of an actuator, comprising:
   (a) setting a number of predetermined maximum velocity values corresponding to seek time values;
   (b) determining expected seek times for a number of commands;
   (c) storing the commands in order of their respective expected seek times in a queue;
   (d) determining which of the seek time values surround a respective expected seek time of a first command in the queue;
   (e) interpolating between predetermined maximum velocity values corresponding to the seek time values surrounding the expected seek time of the first command, to determine an interpolated velocity value; and
   (f) executing the first command utilizing the interpolated velocity value.

8. The method of claim 7, comprising:
   repeating steps (b), (c), (d), (e), and (f) to execute other commands in the queue utilizing interpolated velocity.

9. The method of claim 7, wherein determining expected seek times comprises utilizing a time-based relocation expected access time (TREAT) algorithm.

10. The method of claim 9, further comprising applying penalties to commands with expected seek times below a threshold to generate adjusted expected seek times and using velocity values corresponding to the adjusted expected seek times for interpolation.

11. The method of claim 7, wherein the first command is the command in the queue with the shortest expected seek time.

12. A controller for saving power in a hard drive by regulating the velocity provided to an actuator, comprising:
   a queue for storing seek commands; and
   logic for determining velocity values corresponding to expected seek times of commands, interpolating between determined velocity values to calculate interpolated velocity levels, and executing commands utilizing the interpolated velocity levels to control the actuator during execution.

13. The controller of claim 12, wherein the logic is configured to determine expected seek times utilizing a time-based relocation expected access time (TREAT) algorithm.

14. The controller of claim 12, further comprising a control register allowing the interpolation to be enabled.

15. A hard drive, comprising:
   an actuator;
   a table for storing a discrete number of seek times and corresponding velocity values; and
   a controller configured to determine velocity values corresponding to expected seek times of commands, retrieve velocity values from the table corresponding to seek times surrounding the expected seek times, interpolate between retrieved velocity values to calculate interpolated velocity levels, and execute commands utilizing the interpolated velocity levels to control the actuator during execution.

16. The hard drive of claim 15, wherein the controller is configured to determine the first expected seek time utilizes a time-based relocation expected access time (TREAT) algorithm.

17. The hard drive of claim 15, wherein further comprising a control register of the controller allowing the interpolation to be enabled.

18. The hard drive of claim 15, further comprising a queue to store a plurality of commands, wherein the controller is configured to store commands in the queue in order of their expected seek time.

19. The hard drive of claim 18, wherein the controller is configured to execute commands from the queue in order of shortest seek time.

20. The hard drive of claim 18, wherein the controller is configured to execute commands utilizing velocity values without interpolation in response to determining the corresponding expected seek times exceed a threshold.

* * * * *